United States Patent
Zaiger

[11] Patent Number: 5,431,483
[45] Date of Patent: Jul. 11, 1995

[54] SUBMARINE SOLUTION MINING CONTAINMENT AND REGULATION COVER AND METHOD

[75] Inventor: Kimo K. Zaiger, Honolulu, Hi.

[73] Assignee: University of Hawaii, Honolulu, Hi.

[21] Appl. No.: 494,670

[22] Filed: Mar. 16, 1990

[51] Int. Cl.⁵ .................. E21C 45/00; C22B 3/04
[52] U.S. Cl. ............................... 299/9; 299/5; 423/27; 423/DIG. 4
[58] Field of Search ............... 299/5, 8, 9; 37/DIG. 8; 423/27, DIG. 4

[56] References Cited

U.S. PATENT DOCUMENTS

| | | | |
|---|---|---|---|
| 2,678,203 | 5/1954 | Huff | 299/5 X |
| 3,498,674 | 3/1970 | Matthews | 299/4 |
| 3,588,174 | 6/1971 | Rossfelder | 299/8 |
| 3,795,596 | 3/1974 | Kane et al. | 423/DIG. 4 |
| 3,857,651 | 12/1974 | Bruno | 417/171 |
| 3,950,030 | 4/1976 | Girden | 299/9 |
| 4,020,573 | 5/1977 | Wegewijs et al. | 37/63 |
| 4,070,061 | 1/1978 | Obolensky | 299/9 |
| 4,316,680 | 2/1982 | Phipps et al. | 406/49 |
| 4,480,569 | 11/1984 | Veen et al. | 114/74 T |
| 4,497,519 | 2/1985 | Grable | 299/8 |
| 4,666,212 | 5/1987 | Loveday et al. | 299/5 |
| 4,685,742 | 8/1987 | Moreau | 299/8 |
| 4,739,973 | 4/1988 | Herndon | 423/27 |

Primary Examiner—Ramon S. Britts
Assistant Examiner—David J. Bagnell
Attorney, Agent, or Firm—James Creighton Wray

[57] ABSTRACT

Oceanographic mining uses a flexible cover draped over a submarine ore-bearing stratum. The cover serves as a blanket-like structure for application of a leaching substance and isolation of the leachate and stratum from the surrounding water. The leachate infiltrates the stratum and becomes pregnant with intended materials. The leaching solution is subsequently pumped to the surface. The ores are separated from the pregnant leaching solution, enabling the solution to be used again. The cover supports and arranges anchor and sealing tubes and leachate and pregnant liquor tubes. Pumps are mounted on a platform connected to the cover. The cover is deployed by sinking parallel coils and filling peripheral tubes to uncoil and anchor the cover on a sea bed. One cover is spread by tube and is sunk in a controlled manner.

34 Claims, 3 Drawing Sheets

SUBMARINE SOLUTION MINING CONTAINMENT AND REGULATION COVER AND METHOD

BACKGROUND OF THE INVENTION

In recent years there has been much interest in mining deepsea ferromanganese crusts, as potentially economic ore bodies occur within exclusive economic zone (EEZ) areas of countries. These crusts are found on the tops and flanks of seamounts within a wide range of water depth. The crusts are significantly enriched in cobalt, manganese, nickel, titanium and platinum, and represent an important future source of strategic metals. Resource estimates indicate numerous seamounts in the U.S. Middle Pacific EEZ, with a minimum of 5 million tons of accessible crust on each with an average gross value of $510.00 per ton at 1983 metal prices.

Previous ferromanganese crust mining systems require mechanical breakage of the crust by rip teeth on dredge buckets or by various designs of cutters or ultrasonic disintegrators on a bottom crawling mining machine. Physical transport of the ore material to the surface is required by means of continuous line buckets, slurry air lift or slurry hydraulic lift. The ore material is dewatered at the surface by a mining support ship and transported ashore for pyrometallurgical smelting or hydrometallurgical leaching processing and refining.

Solution mining is a relatively recent advent in the history of mining. Modern, large-scale hydrometallurgical processing had to wait for the introduction of electrical power needed for electrolytic reduction and power for transport of large volumes of slurries and solutions. In the past 30 years, solution mining had increased to account for 18% of the U.S. annual copper production, which peaked in 1978 prior to the collapse of the copper industry. Innovations in concentration processes during the past decade have led to significant production of gold, silver and uranium, most notably in conjunction with the use of solution mining heap leach techniques on mine tailing heaps.

There are a number of variations in process and procedure in hydrometallurgical ore leaching practice, dependent on ore composition and grade. Hydrometallurgy in situ leaching is used in the following processes:

Sulfuric acid leach solution (barren leach liquor) is directly applied to the ore body.

Metals present in the ore such as cobalt, manganese, iron, nickel and copper are extracted as soluble sulfates and are drawn off as a pregnant leach liquor.

Metals are selectively separated from the pregnant leach liquor by different conventional processes.

For example, cobalt is separated and purified by extraction from the pregnant leach liquor by a highly selective cobalt-to-iron exchange solvent or resin such as Amberlite DPL forming a concentrated liquor. The cobalt can then be recovered from the concentrated liquor by precipitation by hydrogen gas reduction or by electrowinning.

Processed pregnant leach liquor and concentrated liquors are reconstituted and recycled as barren leach liquor.

A number of extractive metallurgy processes potentially suitable for hydrometallurgical mining of ferromanganese ore have been investigated. These include ammoniacal leach with ferrous sulfate reductant, cuprion ammoniacal leach, hypochlorous acid leach, and sulfuric acid leach. Experimental extraction results for each are favorable compared to traditional smelting process results. However, leach kinetics at the in situ temperatures and pressures of submarine ferromanganese crusts were not considered or evaluated. Further research and development of metallurgy leach processes for submarine solution mining is necessary.

SUMMARY OF THE INVENTION

The present invention applies proven terrestrial hydrometallurgy mining practices to the deep ocean by use of a novel device which delivers and confines the leaching solution to the ore stratum and retrieves the pregnant (metal enriched) solution for processing.

The containment and regulation cover for in situ submarine solution mining consists of a flexible impervious sheet which is draped over the submarine ore bearing stratum with the primary purpose of constraining leach solutions to the ore stratum and preventing leakage to the surrounding sea water. The sheet must have high chemical resistance and the mechanical properties of good flexibility, high abrasion resistance, high tensile strength and high yield stress. Suitable containment regulation covers are made of unmodified or copolymer polypropylene sheet laminate with nylon fiber reinforcement. The shape of the cover is circular, but the shape may be modified to any configuration to account for bathymetric considerations.

Edge sealing is accomplished using a static force method and consists of two or more nested circumferential tubes constructed of elastic material to conform well to surfaces of moderate to low relief attached on or near the edge of the cover sheet. Tubes must have material properties of high chemical resistance and resistance to tearing or abrasion. The tubes are filled with a fluid or slurry of high specific gravity such as barite drilling mud. The weight of the heavy fluid serves as the static force for edge sealing and provides the anchoring support for the cover sheet. Number, diameter and spacing of sealing tubes is dependent upon expected mining site bottom conditions and size and shape of the containment regulation cover.

The leach solution regulation and distribution system consists of two separate radial perforated tube networks located on the underside of the cover. The networks are held in place by sleeves attached to the cover sheet at periodic distances along each length of perforated tubing. The leach solution supply network emanates outwards from a manifold located at the center of the cover sheet and delivers barren leach liquor pumped down from the mining ship.

Uptake of pregnant liquor is through the leach solution suction network. Perforated tubes of the suction network are radially interspaced between the tubes of the supply network and are connected to a ring manifold located near the perimeter of the cover sheet. Suction is taken on the ring manifold by electric submersible multistage mixed-flow turbine pumps which deliver the pregnant solution to the mining ship. The perforated tubing preferably is semi-rigid to avoid stoppages due to bends and collapses when under suction. Preferably the tubing is flexible enough to conform closely to the bathymetry and to allow for predeployment packing in an articulated umbrella-like manner for transportation. Inexpensive low density thin wall PVC pipe may be used. Ribbed flexible couplings may be used between lengths of pipe to meet the tight packing criteria.

Deployment of the containment regulation cover is made from the ocean surface directly above the mining prospect. A number of vessels of the ocean tug class are required. The cover in transport packing mode is pulled off of its transport/deployment barge and spread out to its full configuration by the tugs, using towing bridles to distribute tow strain. The number of tugs required depends on the size of the containment regulation cover. It is estimated that covers of up to one nautical mile in dimension can be handled by this method. Buoyancy of the cover is maintained by releasable flotation buoys.

Once the cover is spread, the edge sealing tubes are pumped full of heavy slurry or drilling mud. When the sealing tubes are secured, the flotation buoys are released and cover descent begins. Rate of descent is controlled from winches aboard the attendant tugs and is regulated by means of sealable variable-aperture orifices located on the cover sheet. The sinking cover is tracked using transponders and is maneuvered to its target area. After settling on the ore stratum, the descent orifices are sealed and a draw-down test (suction only) is performed to reduce the fluid mass volume confined by the cover and to ensure adequate edge sealing. Following a satisfactory draw-down test, solution mining commences.

A preferred form of the invention uses a rollable rectangular cover and tubes, which are stored on a barge, sunk, and unrolled by inflating peripheral anchor tubes with a heavy fluid.

Submarine solution mining using the present invention is a novel idea which is markedly different from previously proposed systems.

In solution mining using the present containment and regulation cover, the ore stratum is mechanically undisturbed. The only transport material involved is leach solution. All metallurgical processing is done at sea. The mining processes in previously proposed systems are dynamic operations with technical problems related to navigation and control of the mining apparatus on the flanks of seamounts which have variable bathymetric relief, unstable talus slopes and uneven ore body coverage. Those factors have little effect on solution mining using the containment regulation cover, as long as adequate anchoring and edge sealing are maintained. In addition, the present mining system can be constructed and deployed using commercially available components and is an economically viable mining method at present day metal values.

These and further and other objects and features of the invention are apparent in the disclosure, which includes the above and ongoing written specification, with the claims and the drawings.

DETAILED DESCRIPTION OF THE DRAWINGS

Figure 1:
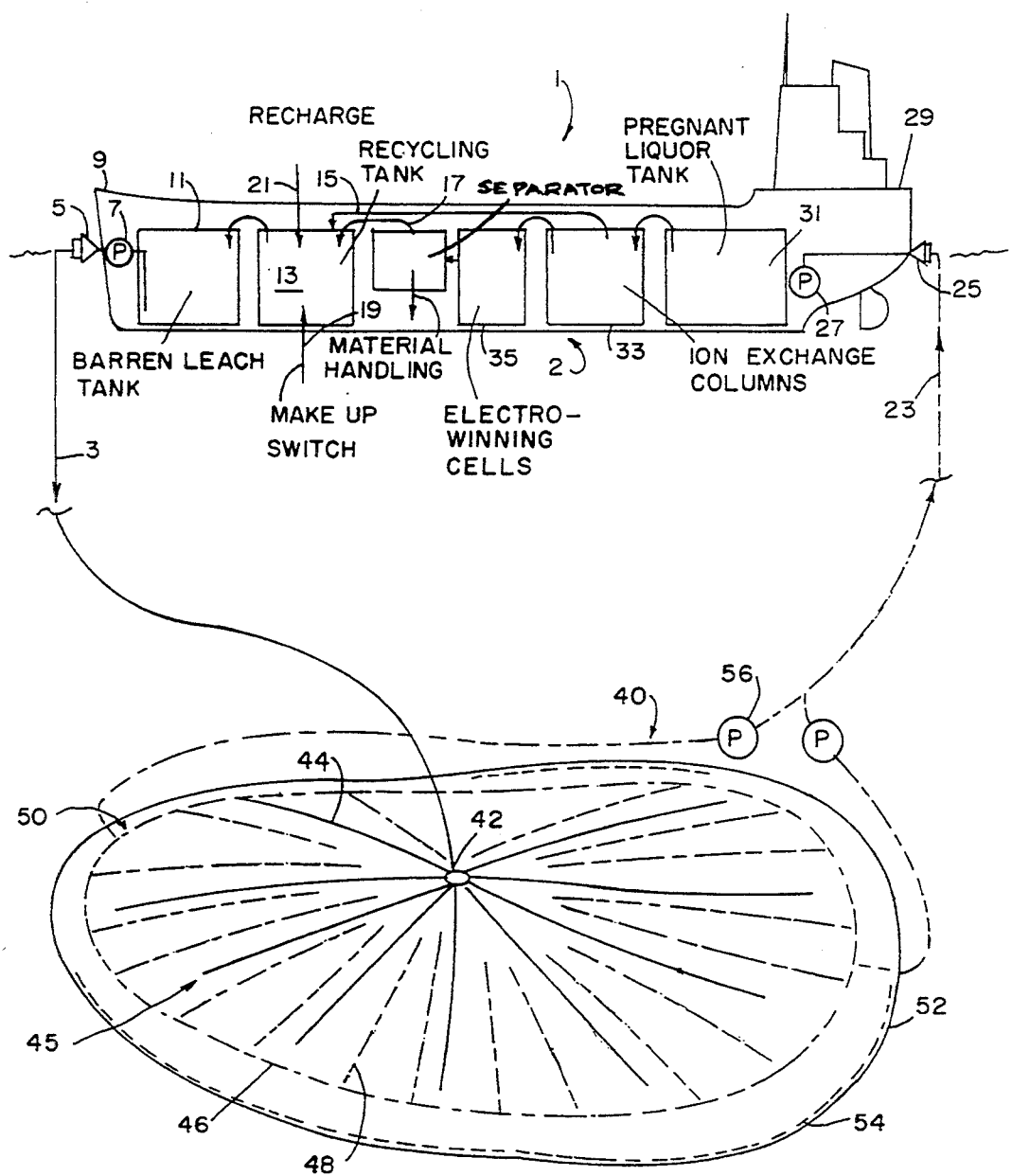
FIG. 1 schematically depicts a submarine solution mining system of the present invention with a containment and regulation cover.

Referring to FIG. 1, a submarine solution mining system uses a containment regulation cover. Mining ship 1 shows schematically details of an onboard hydrometallurgical processing plant 2. An injection hose 3 is connected by a coupler 5 to a pump 7 on a bow 9. Pump 7 draws recycled leach solution from a barren leach tank 11, which is fed from a recycling tank 13. Recycling tank 13 receives recovered leaching solution from intakes 15 and 17, seawater from makeup supply 19, and leach chemicals from recharge line 21.

Intake hose 23 is connected by a connector 25 to an intake of pump 27 in stern 29.

Pregnant liquor is supplied by pump 27 to tank 31. The liquor flows to ion exchange columns 33. Recovered leach solution flows through recycling line 15, and the concentrated liquor is flowed to electrowinning cells 35.

Containment and regulation cover 40 has a barren leach liquor supply manifold 42 and radiating perforated tubes 44 of the supply network 45 shown in solid lines.

Pregnant leach liquor ring manifold 46 and radial perforated tubes 48 of suction network 50 are shown in dash and dot lines. Edge sealing circumferential tubes 52 and 54 surround the cover 40.

Electric submersible multistage mixed-flow turbine pumps 56 discharge through hose 23 to mining ship 1.

Figure 2:
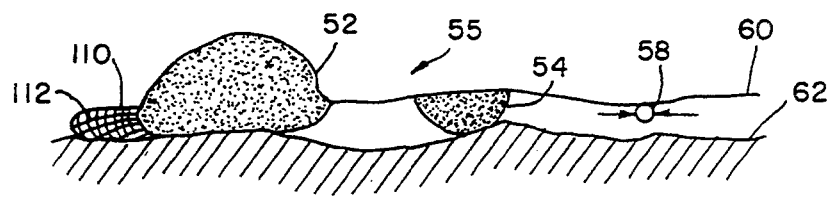
FIG. 2 shows a cross-section of the edge sealing tube system used with a cover.

FIG. 2 shows a cross-section of the edge sealing tube system 55 used with the cover 40. Outer circumferential tube 52 and inner circumferential tube 54 are filled with liquid or slurry with high specific gravity. Circumferential perforated suction tube 58 ties into ring manifold 46 and maintains negative pressure inboard of the sealing tubes 52 and 54 within the containment regulation cover 40. As shown in FIG. 2, the cover is made of a sheet 60 of suitable material as previously described to cover the ore stratum 62.

Figure 3:
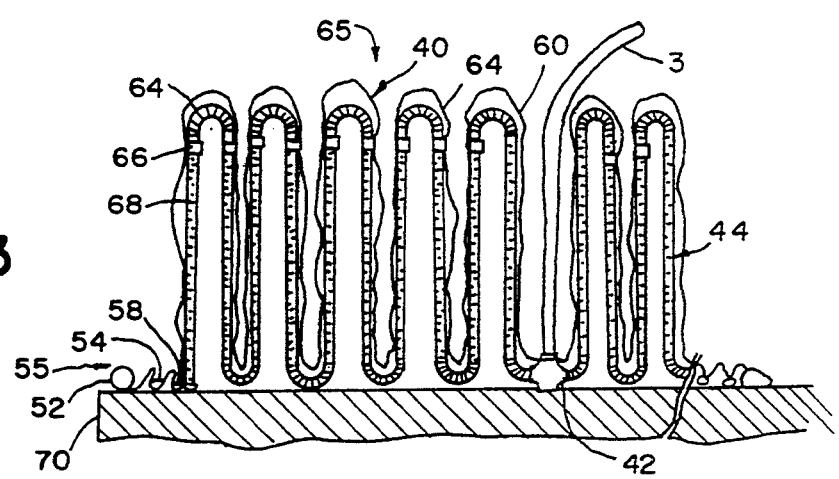
FIG. 3 shows a cross-sectional view of a containment regulation cover in a transport packing mode.

FIG. 3 shows a cross-section of a containment and regulation cover 40 in a transport packing mode 65. Barren leach liquor supply line 3 leads through sheet 60 to manifold 42. Ribbed flexible couplings 64 and tube support sleeves 66 are connected to lengths 68 of perforated tubes 44. An edge sealing system 55 is spaced from the center supply manifold 42 on the transport/deployment barge 70.

Figure 4:
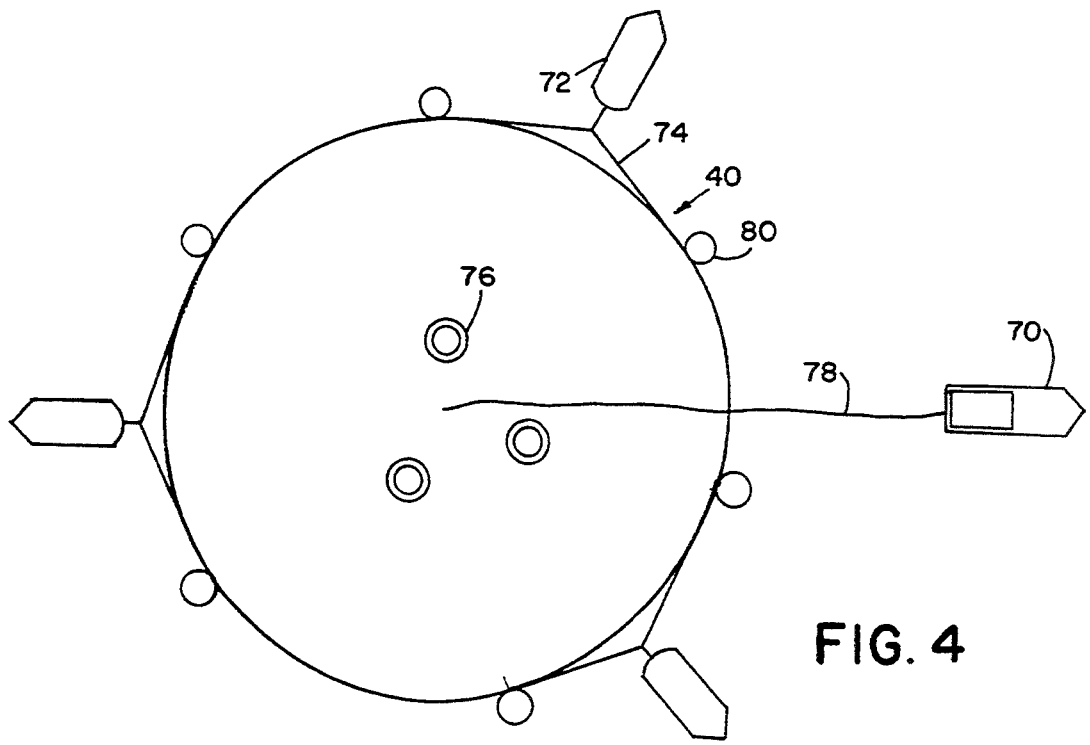
FIG. 4 shows a plan view of the containment and regulation cover during deployment.

FIG. 4 shows a plan view of the containment regulation cover 40 during deployment. Ocean tugs 72 use towing bridles 74 to spread the cover 40. Sealable variable-aperture orifices 76 allow uniform sinking of the cover. Supply and suction lines and power cables are outhauled 78 from transport/deployment barge 70. Releasable flotation buoys 80 are used during deployment.

Figure 5:
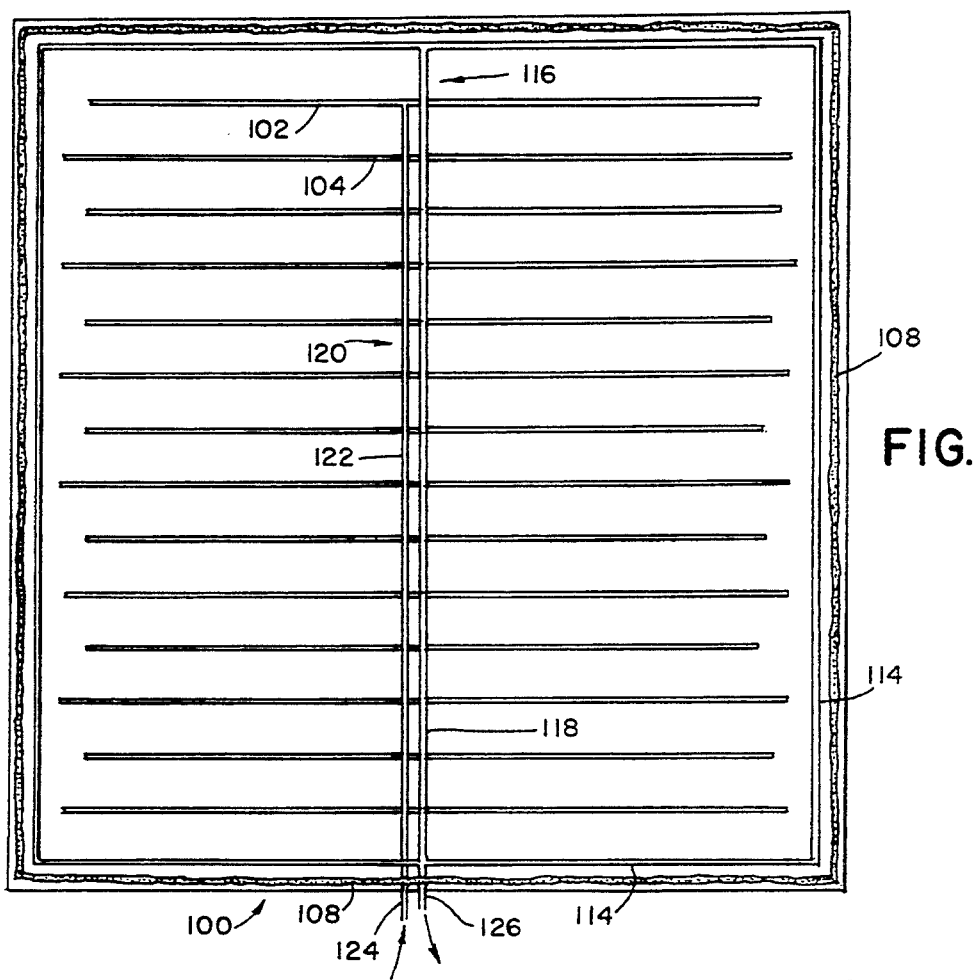
FIG. 5 is a plan view of a preferred rectangular confinement and recovery cover.
Figure 7:
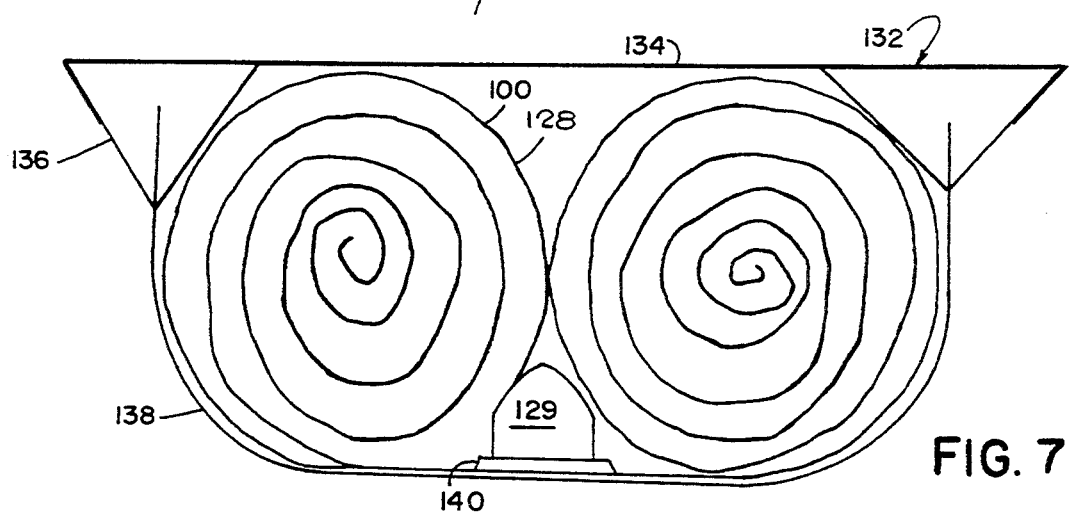
FIG. 7 is a schematic detail of a cover from FIG. 5 packed for transportation in a barge.
Figure 6:
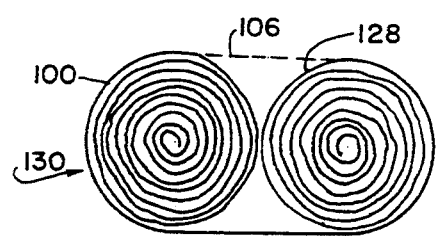
FIG. 6 is a schematic representation of a transportation mode of the cover shown in FIG. 5.

As shown in FIGS. 5, 6 and 7, an alternate to the circular containment regulation cover shape provides maximum area coverage for amount of material used by employing rectangular cover 100. This simplifies the hydraulic control problem of applying and retrieving the leachate on the ore body 62 by evenly spacing supply 102 and suction 104 perforated tube elements. This design also allows deployment of the containment regulation cover 100 by unrolling on the mine site. The bottom unrolling deployment method has nearly identical logistical needs and navigation procedure while lowering and system testing as the surface spreading method. The major difference is in the spreading evolution. After releasing the containment regulation cover 100 roll packing constraints 106, unrolling is accomplished on the bottom by taking outward tension on the free rolls using opposed tugs coupled with simultaneous inflation of the sealing tubes 108 with the heavy slurry or drilling mud. Additional inflation tubes may also be incorporated into the containment regulation cover design spaced on the sheet parallel to the spreading direction to aid in the spreading evolution and to provide a measure of structural support. These inflation tubes may be pressurized with sea water or heavy slurry. This produces an unrolling motion with minimal sliding or tearing stress on the containment regulation cover at the crust interface roughly analogous to the action of a Caterpillar tractor tread or a new year's party toy.

The preferred leachate is essentially a warm, heavy brine with a low pH due to a high concentration of salts of ionic species that are naturally found in sea water. Due to a specific gravity greater than sea water, any fugitive leachate will cascade downslope as a density flow. As fugitive flow progresses downslope, diffusion into and mixing with sea water results in rapid neutralization of the acidity due to the sea water alkalinity. A device may be attached to the outboard side of the containment regulation cover edge sealing tubes that will also aid in neutralizing the acidity of the leachate at the point of escape. This device is a circumferential mesh net 110 which contains crushed limestone 112.

FIG. 5 is a plan view of rectangular containment regulation cover 100 with edge sealing circumferential tubes 108. Circumferential perforated suction tubing 114 serves to maintain negative pressure inboard of the containment regulation cover sealing tubes 108.

The suction network 116 has a header 118 with perforated suction tubes 104. The supply network 120 has a header 122 with perforated leach liquor distribution tubes 102. Leach liquor supply inlet 124 is connected to hose 3 from mining ship 1. Pregnant liquor outlet 126 is connected to pumps 129, which increase pressure in hose 23 to lift pregnant liquor up to the mining ship for processing.

FIG. 6 is a side profile of the rectangular containment regulation cover 100 in dual roll 128 transport packing configuration 130.

FIG. 7 is a cross-section of rolled rectangular containment regulation cover 100 showing details of transport barge 132. Dimensions given are preliminary and for conceptual purposes only. Waterproof cargo cover 134 covers barge 132. Fiberglass/foam flotation pontoons 136 support a fiber-reinforced Neoprene hull 138 and a central pump mounting platform 140. The coiled leachate mining canopy 100 is stored in two coils 128. Each canopy coil contains a canopy portion 660' (⅛ mile) wide and 1320' long. If two inches is allowed between successive turns and the innermost turn has a diameter of 1', then, by adding the successive circumference, the following is obtained:

34 turns = approximately 663' and total 12' 4" in diameter.

The preferred rectangular cover is sunk by flooding the pontoons 136. Cables are attached to ends of the pontoons to control descent and positioning and to raise the recoiled cover. Upon reaching the bottom, the waterproof cover 134 is disconnected from one or both of the pontoons 136, and heavy liquid is pumped into anchoring tubes 108 to unfurl both rolls along the sea bed. Sea water is suctioned through tubes 104 and 114 before introducing the leachate through tubes 102.

After completion of the mining, the cover may be rolled, lifted slightly and relocated.

Alternately, the hull 138 may be released from one or both pontoons 136 before lowering the rolled cover 100 and pump platform 140 to the sea bed.

While the invention has been described with reference to specific embodiments, modifications and variations of the invention may be constructed without departing from the scope of the invention, which is described in the following claims.

I claim:

1. An undersea mining apparatus comprising:
   a cover for spreading across a sea bed;
   anchors connected to the cover for holding the cover edge down on a sea bed;
   leachate tubes mounted on the cover for releasing a leachate beneath the cover on the sea bed;
   suction tubes mounted on the cover for withdrawing from beneath the cover a pregnant liquor containing the leachate and sea bed minerals dissolved and entrained therein.

2. The apparatus of claim 1, further comprising spreaders connected to the cover for spreading the cover across a sea bed.

3. The apparatus of claim 2, wherein the spreaders comprise towing straps attached to edges of the cover.

4. The apparatus of claim 2, wherein the spreaders comprise spreader tubes connected to the cover for filling with a fluid for straightening the tubes and spreading the covers.

5. The apparatus of claim 1, wherein the anchors comprise anchor tubes connected to the cover for filling with heavy liquid and holding the cover downward.

6. The apparatus of claim 5, wherein the anchor tubes are connected to edges of the cover for holding the edges downward 7. The apparatus of claim 1, wherein the leachate tubes and the suction tubes are mounted on a lower surface of the cover at spaced locations.

8. The apparatus of claim 7, wherein the leachate tubes and the suction tubes are arranged in arrays of alternate leachate and suction tubes.

9. The apparatus of claim 8, wherein the leachate tubes and suction tubes are arranged in radial arrays, and wherein the cover has a curvilinear edge.

10. The apparatus of claim 8, wherein the leachate tubes and suction tubes are arranged in a rectilinear array, and wherein the cover has rectangular edges.

11. The apparatus of claim 8, wherein the suction tubes are connected near edges of the cover.

12. The apparatus of claim 1, wherein the cover is circular.

13. The apparatus of claim 1, wherein the cover is rectangular.

14. The apparatus of claim 13, wherein the cover is stored in two lateral coils.

15. The apparatus of claim 14, further comprising a pump mounted between the two coils.

16. The apparatus of claim 14, further comprising an elongated transport barge configured for holding the two coils.

17. The apparatus of claim 16, wherein the transport barge has two pontoons, one on either side of the two coils, and a reinforced flexible hull extending between the two pontoons and under the coils.

18. The apparatus of claim 17, wherein the barge has a waterproof cargo cover extending between the two pontoons and over the coils.

19. The apparatus of claim 13, further comprising edge mounted spreader tubes connected along coiled edges of the cover to spread and deploy the cover.

20. The apparatus of claim 1, wherein the anchors comprise weighted sealing tubes connected to the cover along peripheral edges thereof.

21. The apparats of claim 1, further comprising a leachate conduit connected to the leachate tubes and extending upward therefrom toward a surface of the ocean and a pregnant liquor conduit connected to the suction tubes and extending upward therefrom toward the surface.

22. The apparatus of claim 21, further comprising pumps connected between the suction tubes and the pregnant liquor conduit.

23. The apparatus of claim 21, further comprising a processing plant having an intake connected to the pregnant liquor conduit and having an exhaust connected to the leachate conduit, and having a storage tank, ion exchange columns, electro-winning cells, a separator, a recycling tank and a barren leach tank connected in sequence between the intake and the exhaust.

24. The apparatus of claim 23, wherein the plant is held within a floating hull.

25. A method of recovering minerals from underwater deposits comprising deploying a cover over a deposit, sealing peripheral edges of the cover, evacuating sea water from under the cover, flowing a leachate beneath the cover, dissolving and entraining minerals within the leachate beneath the cover, withdrawing a pregnant liquor containing the leachate and dissolved and entrained minerals, pumping the pregnant liquor toward a surface of water, separating minerals from the liquor, reclaiming the leachate from the liquor, recycling the leachate and flowing the leachate to the cover.

26. The method of claim 25, further comprising storing the pregnant liquor, enriching the liquor by ion exchange and electrolytically separating minerals from the liquor.

27. The method of claim 25, wherein the flowing of the leachate comprises releasing the leachate in a predetermined pattern from perforated tubes beneath the cover, and wherein the withdrawing comprises withdrawing the pregnant liquor in a predetermined pattern through perforated tubes under the cover.

28. The method of claim 27, wherein the releasing and withdrawing comprise releasing and withdrawing from interposed arrays of leachate tubes and pregnant liquor tubes and withdrawing pregnant liquor from peripheral edges of the cover.

29. The method of claim 25, further comprising dissolving limestone in sea water around peripheral edges of the cover.

30. The method of claim 25, wherein the deploying comprises towing a cover to a position above a sea bed, tugging the cover to a spread condition, and lowering the cover onto the sea bed.

31. The method of claim 25, wherein the deploying comprises inflating peripheral tubes on the cover with fluid.

32. The method of claim 31, wherein the inflating comprises inflating the peripheral tubes with a heavy liquid.

33. The method of claim 25, wherein the flowing comprises introducing leachate to regularly spaced perpendicular leachate laterals from a central leachate header, and wherein the withdrawing comprises suctioning pregnant liquor from regularly spaced liquor laterals and peripheral tubes into a central pregnant liquor header.

34. The method of claim 25, wherein the deploying comprises sinking a barge to a mineral deposit, sliding parallel coiled cover portions and an intermediate pumping platform from the barge, inflating peripheral tubes on the covers with a heavy liquid, and uncoiling the cover over the mineral deposit.

* * * * *